United States Patent
Chen et al.

(10) Patent No.: US 10,754,641 B2
(45) Date of Patent: Aug. 25, 2020

(54) OPTIMIZING CONTINUOUS INTEGRATION (CI) USING CODE REVIEW QUALITY

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 700 days.

(21) Appl. No.: 15/608,585

(22) Filed: May 30, 2017

(65) Prior Publication Data

US 2018/0349789 A1    Dec. 6, 2018

(51) Int. Cl.
G06F 8/70     (2018.01)
G06F 9/48     (2006.01)
G06N 20/00    (2019.01)

(52) U.S. Cl.
CPC .............. *G06F 8/70* (2013.01); *G06F 9/4881* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,507,582 B2 | 11/2016 | Jacob et al. | |
| 9,612,821 B2 | 4/2017 | Iyer et al. | |
| 2013/0152047 A1 | 6/2013 | Moorthi et al. | |
| 2015/0052501 A1* | 2/2015 | Shani | G06F 11/3688 717/124 |
| 2015/0370554 A1* | 12/2015 | Benedict | G06F 8/70 717/101 |
| 2017/0039062 A1 | 2/2017 | Wood et al. | |
| 2017/0039126 A1* | 2/2017 | Wood | G06F 11/3628 |

FOREIGN PATENT DOCUMENTS

| | | |
|---|---|---|
| CN | 106227574 A | 12/2016 |
| CN | 106293749 A | 1/2017 |

OTHER PUBLICATIONS

Continuous Delivery: A Maturity Assessment Model, Forrester Research, Inc., Mar. 2013 (26 pages).
D5.1 Continuous Integration and Testing Approach, Sonata, Jul. 12, 2015 (41 pages).
Laukkanen et al., Problems, causes and solutions when adopting continuous delivery—A systematic literature review, Information and Software Technology, vol. 82, Feb. 2017, pp. 55-79.
Meek, Wryen, Code review, continuous integration, and deployment processes, dated Mar. 4, 2017 (1 page).

* cited by examiner

*Primary Examiner* — Qing Chen
(74) *Attorney, Agent, or Firm* — K&L Gates LLP

(57) ABSTRACT

A system and method for optimizing CI using code review quality includes a memory, a processor in communication with the memory, a classifier executing on the processor, a high priority integration queue, and a low priority integration queue. In an example, the classifier may receive pull requests for code changes and determine reliability factors. The classifier may also determine a reliability value of the pull requests based on the reliability factors and classify each of the pull requests into a classification, such as a trusted classification and an untrusted classification. Then, the classifier sends the pull requests in the trusted classification to the high priority integration queue and the pull requests in the untrusted classification to the low priority integration queue.

18 Claims, 7 Drawing Sheets

OPTIMIZING CONTINUOUS INTEGRATION (CI) USING CODE REVIEW QUALITY

BACKGROUND

Code developers frequently make and submit changes to source code. For example, a code developer may make a code change to the source code of an application or a web server stored in a source code repository. The code change may then be merged into the source code of the application or the web server stored in the source code repository. Prior to the code change being merged into the application or the web server, various tests may be performed on the code change to ensure that the application or the web server can work as designed when the code change is integrated with the application or the web server.

Continuous integration (CI) is a modern technology used in software engineering and software quality assurance. A continuous integration system is a software development platform configured to frequently integrate new or changed code with an existing code repository, resulting in multiple integrations. There are various continuous integration systems that exist today, such as Buildbot or Jenkins. These CI systems automate the compile/test cycle sometimes required by software projects to validate code changes, making it easier for developers to integrate changes into a project and making it easier for users to obtain a fresh build.

SUMMARY

The present disclosure provides a new and innovative system and methods for optimizing CI using code review quality. For example, an example method includes receiving, by a classifier executing on a processor in communication with a memory, pull requests for code changes. The pull requests may be submitted by contributors. Then, the classifier determines reliability factors, such as a quality of the contributors, a quality of reviews, and the size of the code changes. The classifier determines a reliability value of each of the pull requests based on the reliability factors and classifies each of the pull requests into a classification, such as a trusted classification and an untrusted classification. Then, the classifier sends the pull requests in the trusted classification to a high priority integration queue and sends the pull requests in the untrusted classification to a low priority integration queue.

Additional features and advantages of the disclosed method and apparatus are described in, and will be apparent from, the following Detailed Description and the Figures.

DETAILED DESCRIPTION OF EXAMPLE EMBODIMENTS

Figure 1:
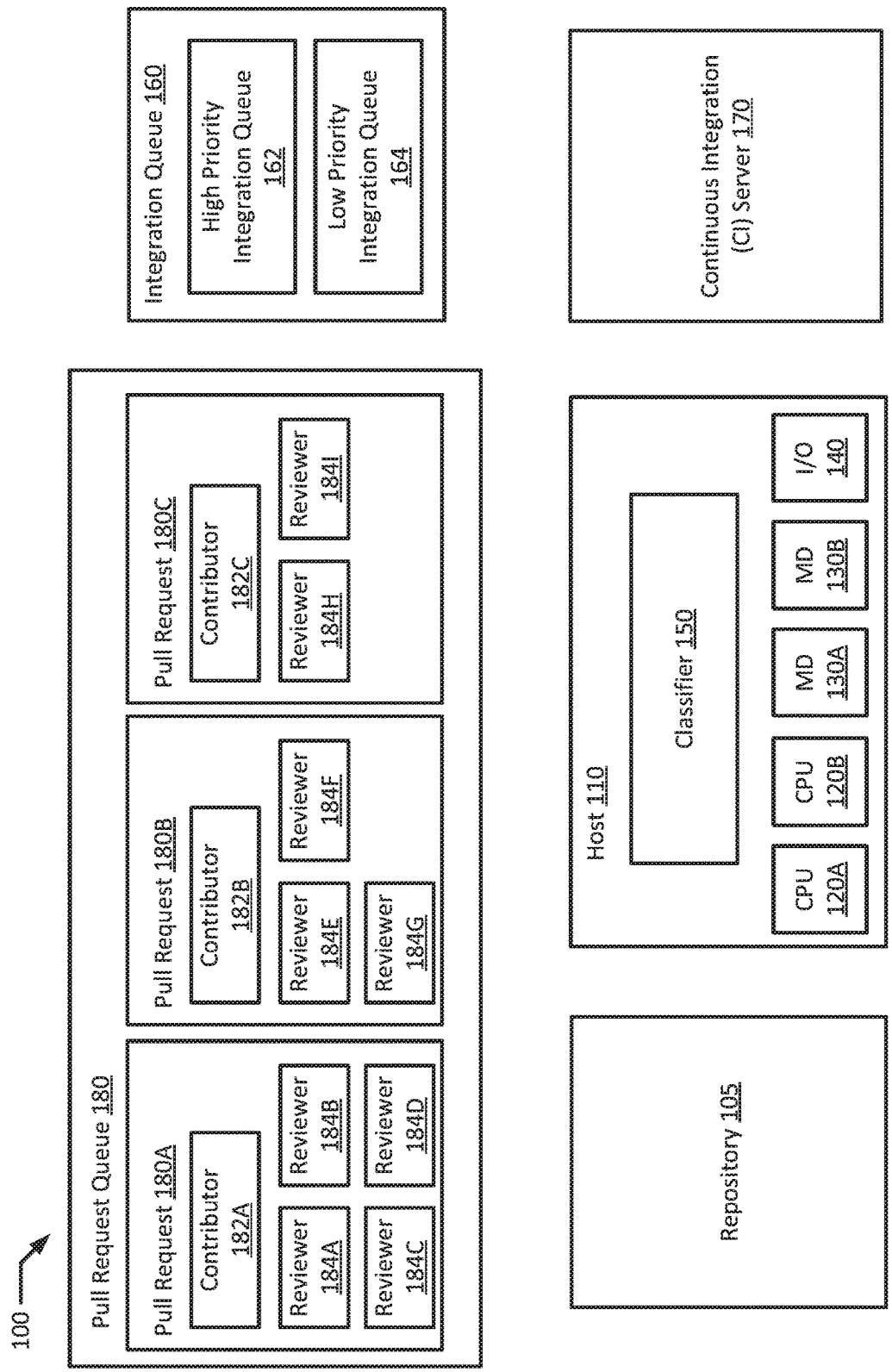
FIG. 1 is a block diagram of an example computer system according to an example of the present disclosure.

Described herein are methods and systems for optimizing CI using code review quality. Typically, in a large-scale collaboration development project, such as Docker®, Kubernetes®, and Openstack®, the quality and efficiency of the CI environment is critical in the overall development process. In particular, as a development project progresses, more code changes are added to or merged with the master source code (e.g., the source code of an application or a web server) and this may increase the number of tests necessary for each pull request. For example, if the number of tests necessary for a pull request in the beginning stage of a development project may be several hundreds, the number of tests necessary for a pull request in a later stage may become several thousands, and it may take several hours or even days to finish one test cycle, which may require not only more time, but also more resources to run the tests. Since many CI tests may be running using a paid public cloud service, this may increase the total costs of a development project. Conventional CI servers typically treat all pull requests equally without any prioritization, running tests in the order the pull requests arrive and poor quality pull requests, which may fail the CI tests, may merely waste the system resources and delay the development time. In some cases, poor pull request quality, together with a constantly increasing number of tests, may cause the continuous integration to be unstable, which may even block the CI tests. For example, in some development projects (e.g., Kubernetes®), the CI server may be timed out when testing takes too long.

Aspects of the present disclosure may address the above-noted deficiencies. In an example, code developers (e.g., contributors) may submit pull requests for code changes. Upon receiving the pull requests, a classifier may predict the quality of each of the pull requests using reliability factors, such as a quality of the contributors, a quality of reviews (e.g., a quantity and quality of reviewers), and a size of the code changes. The quality of contributors and reviewers may include each contributor and each reviewer's code development experience (e.g., years of code development experience, industry experience, education, and seniority). Then, the classifier may classify a high quality pull request as "trusted" and a low quality pull request as "untrusted." Then, the classifier may send the high quality pull requests to a high priority integration queue and the low quality pull requests to a low priority integration queue.

Then, a CI server may test each of the pull requests, prioritizing the pull requests in the high priority integration queue over the pull requests in the low priority integration queue. For example, the CI server may prioritize the pull requests in the high priority queue by allocating more resources (e.g., CPU cycles) to the high quality pull requests or by testing the high quality pull requests before testing any of the low quality pull requests.

If the pull requests passed the testing, the CI server may merge the code changes in the passed pull requests to the master source code (e.g., source code of an application), prioritizing the high quality pull requests over the low quality pull requests. If the pull requests fail the testing, the CI server may reject code changes in the failed pull requests. In an example, the CI server may produce a test record for the passed and failed pull requests and update or adjust the reliability factors using the test record.

In this way, unlike conventional CI servers that treat all pull requests equally, the CI server of the present disclosure may prioritize more highly trusted pull requests that are likely to be good quality over less trusted pull requests that are likely to be poor quality during the testing and/or merging, preventing the poor quality pull requests from becoming a bottleneck in the development. In addition, in some aspects of the present disclosure, pull requests with features (e.g., code changes) developed by more experienced contributors are likely to be sent to the high priority integration queue. Since more important features are likely to be developed by more experienced (e.g., senior) contributors, the present disclosure may advantageously process more important features, in priority, with fewer delays, reducing the number of unnecessary CI tests and, thereby, making the CI server more efficient and saving development time and costs.

In an example, the CI server may test a batch of at least two pull requests in the high priority integration queue in one test cycle. Generally, there are some overlaps between the tests necessary for the pull requests. For example, if one pull request requires 1500 tests and the other pull request requires 1200 tests, there might be around 300 overlaps. In this case, by testing these two pull requests in the high priority integration queue in one test cycle, the present disclosure may enable the system to remove duplicative tests (e.g., 300 tests). If one of the pull requests tested together in one test cycle is in poor quality, this batch test may merely result in a rejection of the code changes in another pull request, which may be good quality, wasting time and resources. However, since the present disclosure advantageously enables submitting batch tests, where all of the pull requests tested together in one test cycle are highly trusted, the present disclosure may effectively reduce the number of CI tests while avoiding the waste of time and resources. Additional features and advantages of the disclosed method, system, and apparatus are described below.

FIG. 1 depicts a high-level component diagram of an example computer system 100 in accordance with one or more aspects of the present disclosure. The computer system 100 may include a repository 105 storing source code for development projects. In an example, the repository 105 may be a main/public repository shared with project members (e.g., contributors 182A-C and/or reviewers 184A-I). In this case the repository 105 may include master source code (e.g., source code of an application or a web server). In another example, the repository 105 may be a local repository in each code developer's (e.g., contributors 182A-C) local development environment. In this case, the repository 105 may include a local branch of source code (e.g., source code or changes to the source code made locally by the developer).

The system 100 may also include a host machine 110. The host machine 110 may include one or more physical processors (e.g., CPU 120A-B) communicatively coupled to memory (e.g., memory 130A-B) and an input/output device (e.g., I/O 140). In an example, the host machine 110 may include a network device (e.g., a network interface controller (NIC), a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-B refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or processing a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and, hence, share a single socket). A processor may also be referred to as a central processing unit (CPU).

As discussed herein, a memory device 130A-B refers to a volatile or non-volatile memory device, such as RAM, ROM, EEPROM, or any other device capable of storing data. As discussed herein, I/O device 140 refers to a device capable of providing an interface between one or more processor pins and an external device capable of inputting and/or outputting binary data.

Processors 120A-B may be interconnected using a variety of techniques, ranging from a point-to-point processor interconnect, to a system area network, such as an Ethernet-based network. Local connections within the host machine 110, including the connections between a processor 120A-B and a memory device 130A-B and between a processor 120A-B and an I/O device 140, may be provided by one or more local buses of suitable architecture, for example, peripheral component interconnect (PCI).

The system 100 may also include a pull request queue 180. The pull request queue 180 may include pull requests (e.g., pull requests 180A-C) submitted by code developers (e.g., contributors 182A-C). In an example, when a code developer creates a feature (e.g., a small block of source code, such as microservice or any changes to the source code) in a local branch in their local repository, the developer may commit (e.g., make tentative changes permanent) the feature locally to create a revision history. Then, the code developer may submit a pull request (e.g., pull requests 180A-C) so that the local changes or the locally created source code can be reviewed by other project members (e.g., reviewers 184A-I). As used herein, a pull request may refer to a mechanism for a code developer to notify other project members (reviewers 184A-I) about a completed local feature or changes to the source code. In an example, the local branch of the source code may be pushed to a public repository (e.g., repository 105) before or after the pull request is submitted, for example, so that the local feature can be shared with the reviewers 184A-I.

Once a pull request is submitted, other project members (e.g., reviewers 184A-I) may review the local features/changes and/or discuss potential modifications. In some cases, the code changes in the pull request may be modified by the contributor or the reviewers (e.g., to correct errors in the code changes) based on the comments from the reviewers before the pull request is sent to or classified by a classifier 150.

In an example, the reviewers 184A-I may be invited by other project members or contributors 182A-C to review the pull requests 180A-C. In an example, the system 100 may include a voting mechanism for selection of the reviewers 184A-I. For example, when a pull request is submitted, the project members and/or the contributor may vote for who will review the submitted pull request. In another example, the reviewers 184A-I may be selected randomly or in any other suitable way.

In an example, the host machine 110 may include the classifier 150 running on the physical processors 120A-B. The classifier 150 may be configured to classify pull requests 180A-C (e.g., the reviewed pull requests) into a classification, such as a trusted classification and/or an untrusted classification, and/or send the classified pull requests to the integration queue 160 (e.g., high priority integration queue 162 or low priority integration queue 164).

The system 100 may include an integration queue 160. In an example, the integration queue 160 may include a high priority integration queue 162 and a low priority integration queue 164. In another example, the integration queue 160 may include more than two queues (e.g., three queues: high, neutral, and low priority integration queues; four queues: highly trusted, trusted, untrusted, and highly untrusted integration queues). The integration queue 160 (e.g., the high and low priority integration queues 162, 164) may be in communication with the host machine 110. In an example, the integration queue 160 may be a virtual device. For example, the integration queue 160 may be a virtual component of the host machine 110. In another example, the integration queue 160 may be separate from the host machine 110. In an example, the integration queue 160 may be a physical device.

In an example, the system 100 may include a continuous integration (CI) server 170. The CI server 170 may be in communication with the integration queue 160 and/or the host machine 110. In an example, the CI server 170 may be a virtual device. For example, the CI server 170 may be a virtual component of the host machine 110. In another example, the CI server 170 may be separate from the host machine 110. In an example, the CI server 170 may be a physical device.

The CI server 170 may be configured to run tests for each of the pull requests 180A-C. For example, the CI server 170 may integrate new or changed code with an existing code repository, resulting in multiple integrations and automate the compile/test cycle required by software projects to validate code changes (e.g., to determine whether the new or changed code would work properly with the existing code in the main/public repository). One test cycle may include hundreds or thousands of tests and the number of tests may increase as a development project progresses. In an example, the number of tests necessary for each pull request may be different. For example, pull request 180A may require 1500 tests and pull request 180B may require 1200 tests. In an example, the CI server 170 may be configured to merge the code changes in the pull requests that passed the testing.

Figure 2:
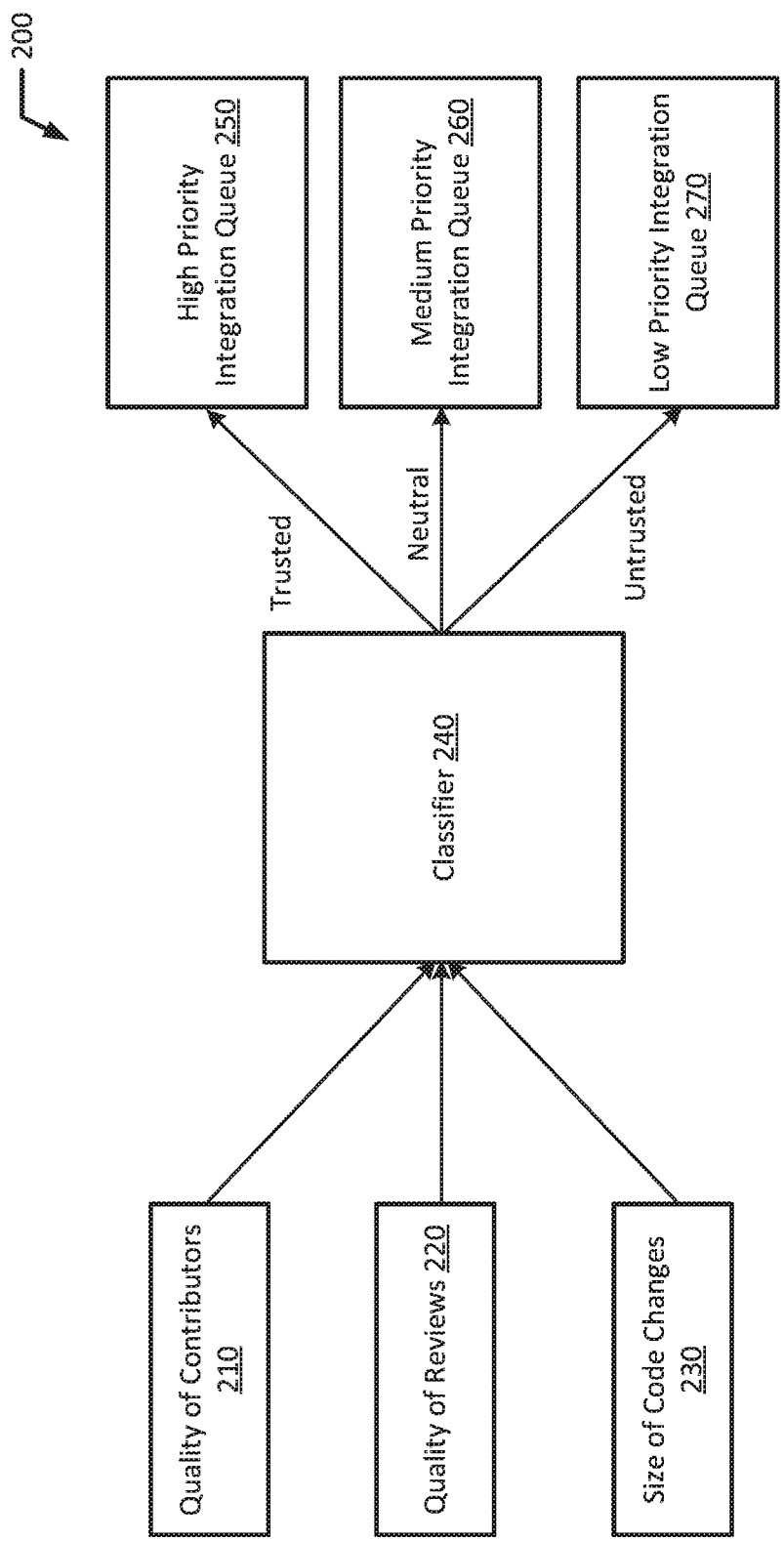
FIG. 2 is a block diagram illustrating factors considered by an example classifier in classifying pull requests according to an example of the present disclosure.

FIG. 2 illustrates factors considered by an example classifier 240 in classifying pull requests according to an example of the present disclosure. In an example, the classifier 240 may consider various reliability factors in classifying the pull requests 180A-C. The reliability factors considered by the classifier may include a quality of contributors 210, a quality of reviews 220, and/or the size of code changes 230. In an example, the quality of contributors 210 may include each contributor's code development experience (e.g., years of code development experience, industry experience, education, seniority, etc.) and/or a testing failure rate for the pull requests submitted by the contributor. In an example, the more the contributor of a pull request is experienced or the lower the testing failure rate, the more likely the classifier 240 may classify the pull request as trusted.

In an example, the quality of reviews 220 may include the number of reviewers who participated in a review of each of the pull requests and/or the quality of the reviewers. The quality of the reviewers may include the number of reviews that each reviewer has conducted previously, each reviewer's code development experience (e.g., years of code development experience, industry experience, education, seniority, etc.), and each reviewer's testing failure rate. The number of reviews that each reviewer has conducted previously may indicate the quality of the reviewers because the more the reviewer was invited to review submitted pull requests previously, the more likely the reviewer is a good reviewer. In an example, the more the reviewer is experienced or the lower the testing failure rate, the more likely the classifier 240 may classify the pull request reviewed by the reviewer as trusted. In an example, the greater the number of reviews, the more likely the classifier 240 may classify the pull request reviewed by the reviewer as trusted, but at some point, the number of additional reviewers may not further affect the quality of the reviews. For example, if there are a predetermined number of highly trusted reviewers (e.g., two or three highly trusted reviewers) in a pull request, adding more reviewers to the pull request (e.g., 5 or 10 more reviewers) may not increase the quality of the reviews.

The classifier 240 may also consider the size of code changes 230 (e.g., source code changes or newly created source code) in each pull request 180A-C. For example, the greater the size of the code changes in a pull request, the more likely the classifier 240 may classify the pull request as untrusted. The smaller the size of the code changes in a pull request, the more likely the classifier 240 may classify the pull request as trusted. In an example, the classifier 240 may determine the reliability factors using machine learning techniques and adjust the reliability factors based on test records using the machine learning techniques, as discussed below. In an example, the reliability factors may be stored in a database of the system 100. In another example, the reliability factors may be stored in a local memory (e.g., MD 130A-B) of the host machine 110.

In an example, based on the reliability factors, the classifier 240 may determine each pull request's reliability value (e.g., from 0 (completely untrusted) to 3 (completely trusted)). In an example, the classifier 240 may determine the reliability value using machine learning techniques. In an example, once the reliability value of each pull request is determined and classified, the classifier 240 may send the pull requests to one of the integration queues 250, 260, 270. For example, the pull requests in the trusted classification may be sent to the high priority integration queue 250, the pull requests in the neutral classification may be sent to the medium priority integration queue 260, and the pull requests in the untrusted classification may be sent to the low priority integration queue 270.

In an example, the system 200 may include a table of the reliability factors for the pull requests 180A-C. For example, the table may include each contributor's code development experience (e.g., years of code development experience, industry experience, education, seniority, etc.) and/or a testing failure rate, each reviewer's review history (e.g., the number of reviews that each reviewer has conducted previously and/or their testing failure rate), and the size of code changes and the number of reviewers for each pull request. In an example, the classifier 240 may determine a reliability value for each contributor or each reviewer (e.g., from 0 (completely untrusted) to 3 (completely trusted)) based on each contributor and reviewer's code development experience, testing failure rate, and/or review history. The classifier 240 may use the reliability value of the contributors and reviewers in determining the reliability value of the pull requests.

Figure 3:
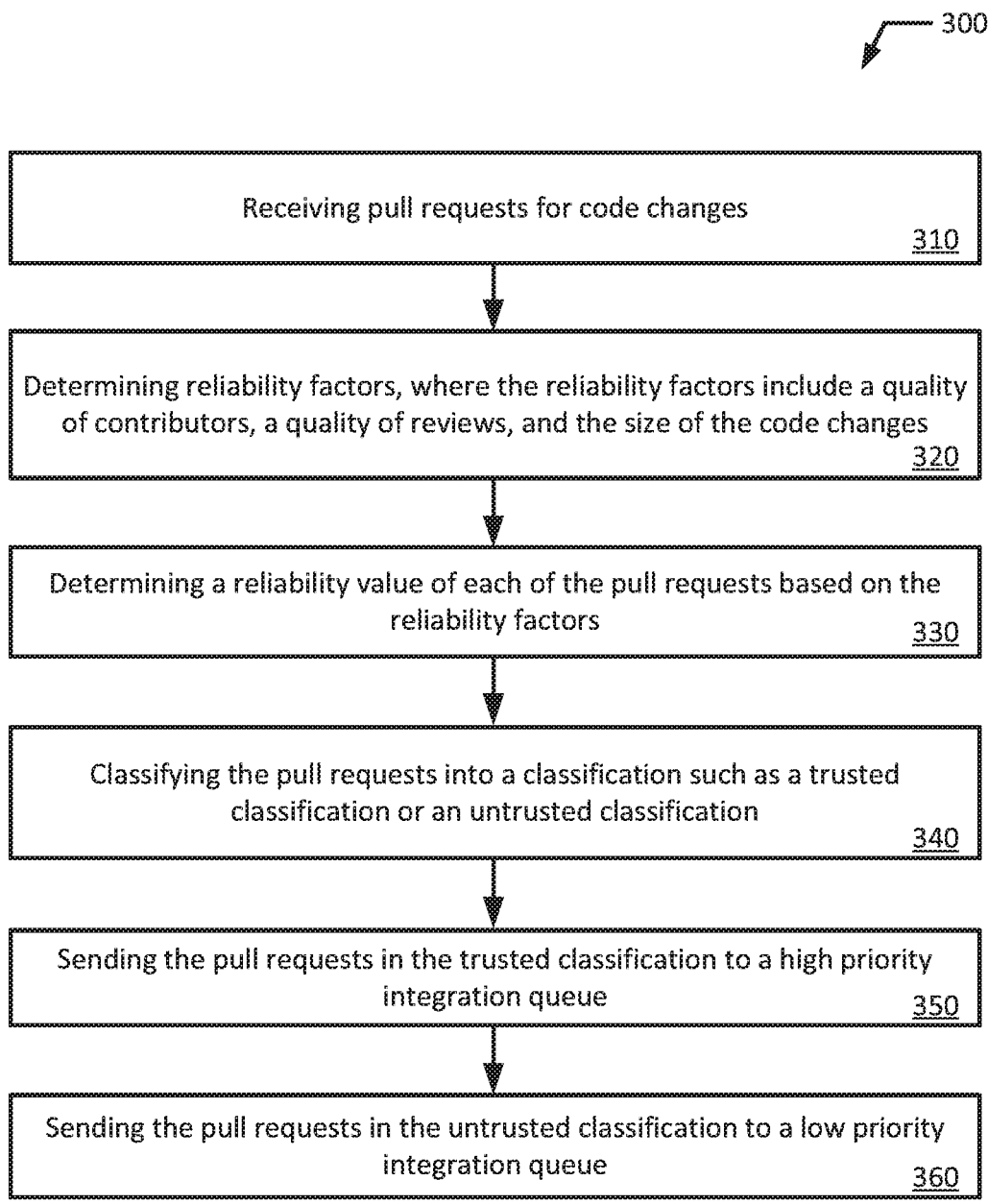
FIG. 3 is a flowchart illustrating an example process for optimizing CI using code review quality according to an example of the present disclosure.

FIG. 3 shows a flowchart of an example method 300 for optimizing CI using code review quality. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, a classifier may receive pull requests for code changes (block 310). The pull requests may be submitted by contributors. For example, a classifier 150 may receive pull requests 180A-C for code changes, where the pull requests 180A-C are submitted by contributors 182A-C. Then, the classifier may determine reliability factors, where the reliability factors include a quality of contributors, a quality of reviews, and the size of the code changes (block 320). For example, the classifier 150 may determine reliability factors including a quality of contributors 210 (e.g., contributor's code development experience and/or a testing failure rate), a quality of reviews 220 (e.g., the number of reviewers who participated in a review of each of the pull requests and/or the quality of the reviewers), and the size of the code changes 230 (e.g., 100, 500, 1000 lines). For example, pull request 180A may be submitted by a senior contributor 182A, be reviewed by four reviewers, three senior reviewers (184A-C) having many review experiences and one junior reviewer 184D having few review experiences, and include 100 lines of code changes. Pull request 180B may be submitted by a senior contributor 182B, be reviewed by three reviewers, two senior reviewers (184E-F) and one junior reviewer 184G, and include 500 lines of code changes. Pull request 180C may be submitted by a junior contributor 182C, be reviewed by two reviewers, one senior reviewer (184H) and one junior reviewer 184I, and include 1000 lines of code changes.

The classifier may determine a reliability value (e.g., from 0 (completely untrusted) to 3 (completely trusted)) of each of the pull requests based on the reliability factors (block 330). For example, the classifier 150 may determine that the reliability values of the pull requests 180A, 180B, and 180C are 2.8, 2.1, and 1.2, respectively. The classifier 150 may set the reliability value of the pull request 180A to be very high (e.g., 2.8) since the pull request 180A is submitted by an experienced code developer 182A, there are many reviewers (four reviewers), three of the reviewers are senior code developers with many review experiences, and the pull request 180A includes only 100 lines of code changes. The classifier 150 may set the reliability value of the pull request 180C to be low (e.g., 1.2) since the pull request 180C is submitted by a less experienced code developer 182C, there are only two reviewers, only one of the reviewers is a senior reviewer, and the size of the code changes (e.g., 1000 lines) is relatively large.

The classifier may classify the pull requests into a classification such as a trusted classification and an untrusted classification (block 340). For example, the classifier 150 may classify the pull requests 180A-C into a classification such as a trusted classification and an untrusted classification (e.g., 0≤reliability value<1.5: untrusted, 1.5≤reliability value≤3: trusted). Then, the classifier may send the pull requests in the trusted classification to a high priority integration queue (block 350). For example, the classifier 150 may send the pull requests in the trusted classification (e.g., pull requests 180A-B) to a high priority integration queue 162. The classifier may send the pull requests in the untrusted classification to a low priority integration queue (block 360). For example, the classifier 150 may send the pull requests in the untrusted classification (e.g., pull request 180C) to a low priority integration queue 164.

Figure 4A:
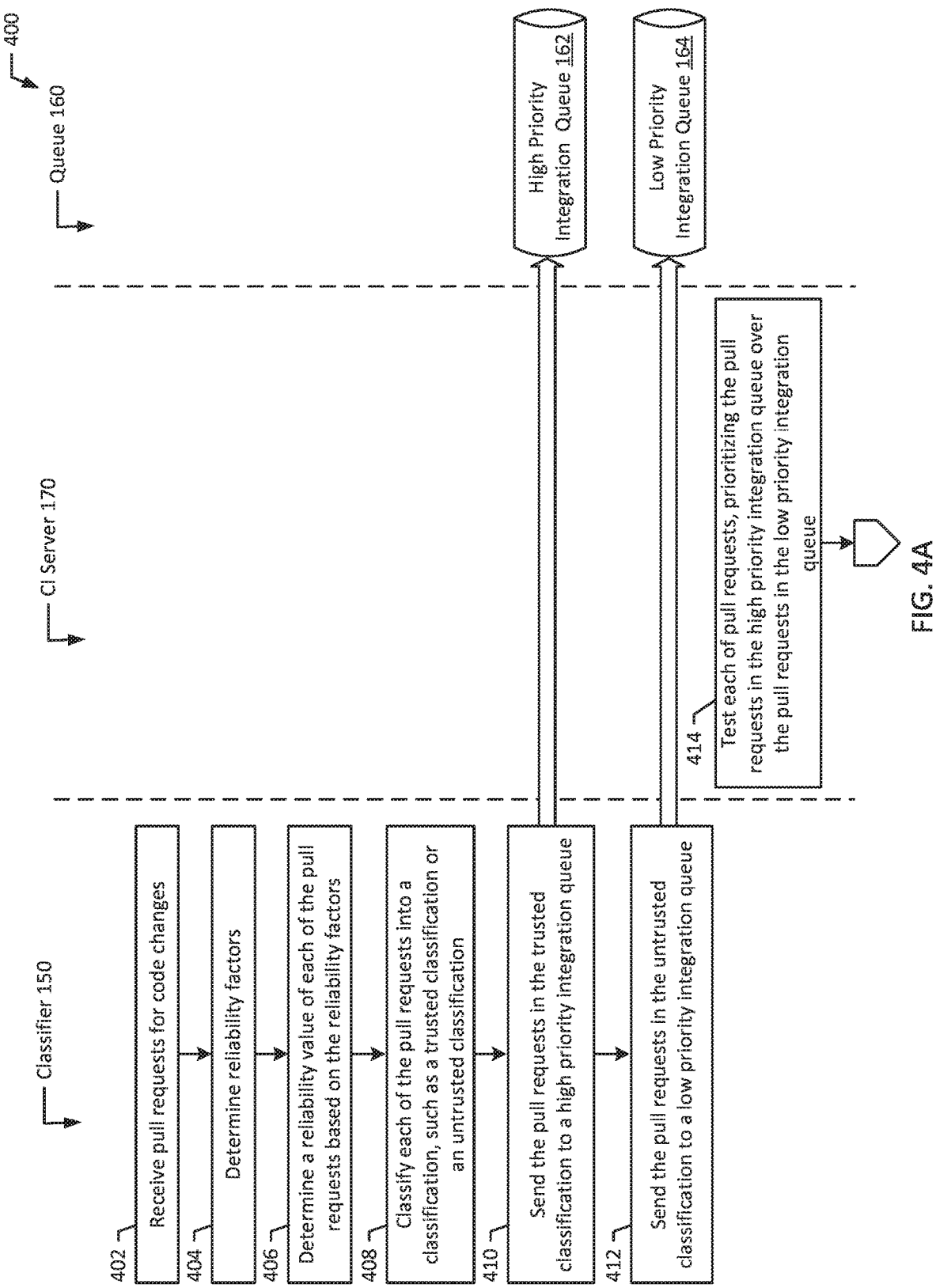
FIGS. 4A, 4B, and 4C are a flow diagram illustrating an example process for optimizing CI using code review quality according to an example of the present disclosure.
Figure 4B:
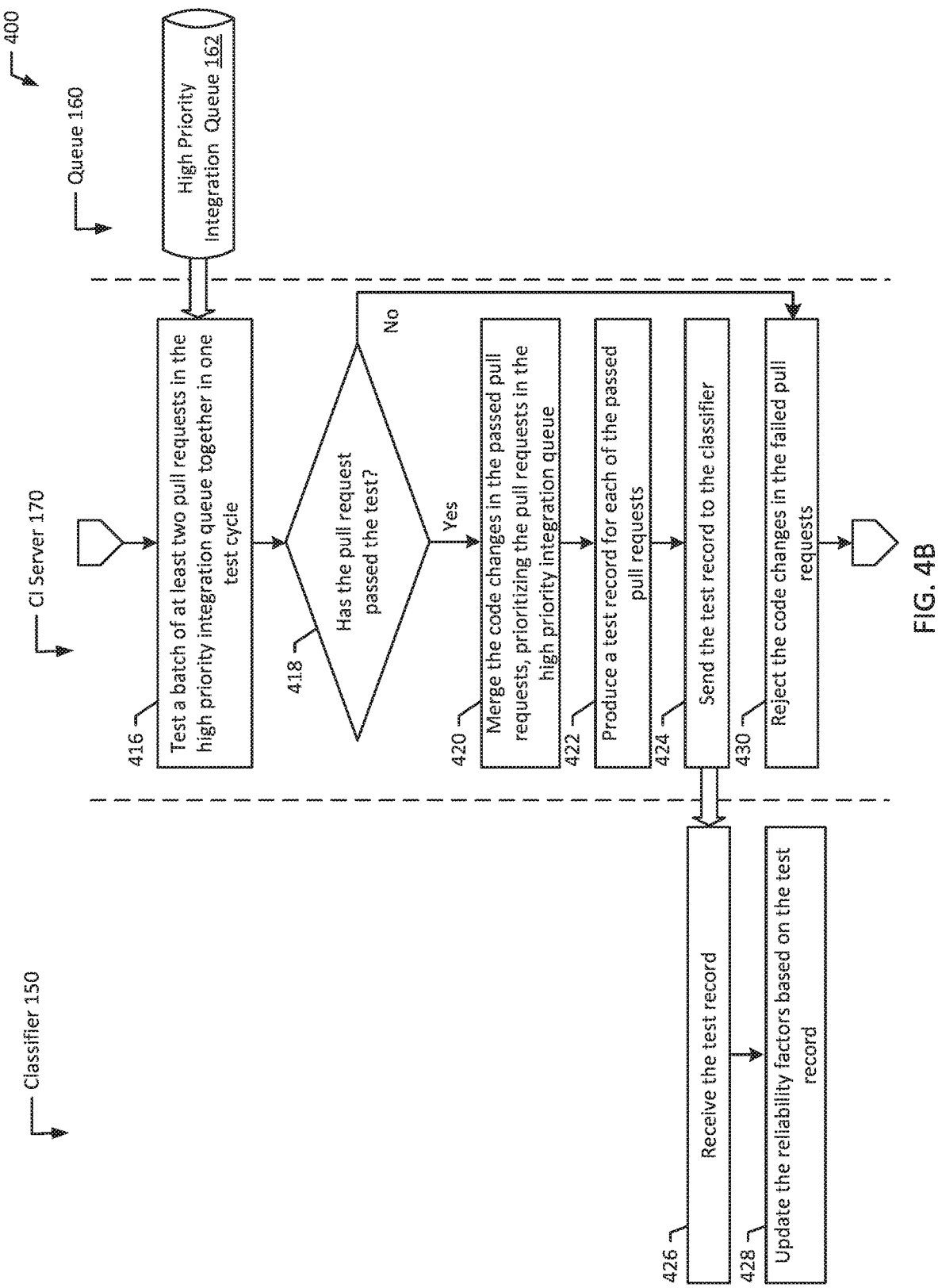
Figure 4C:
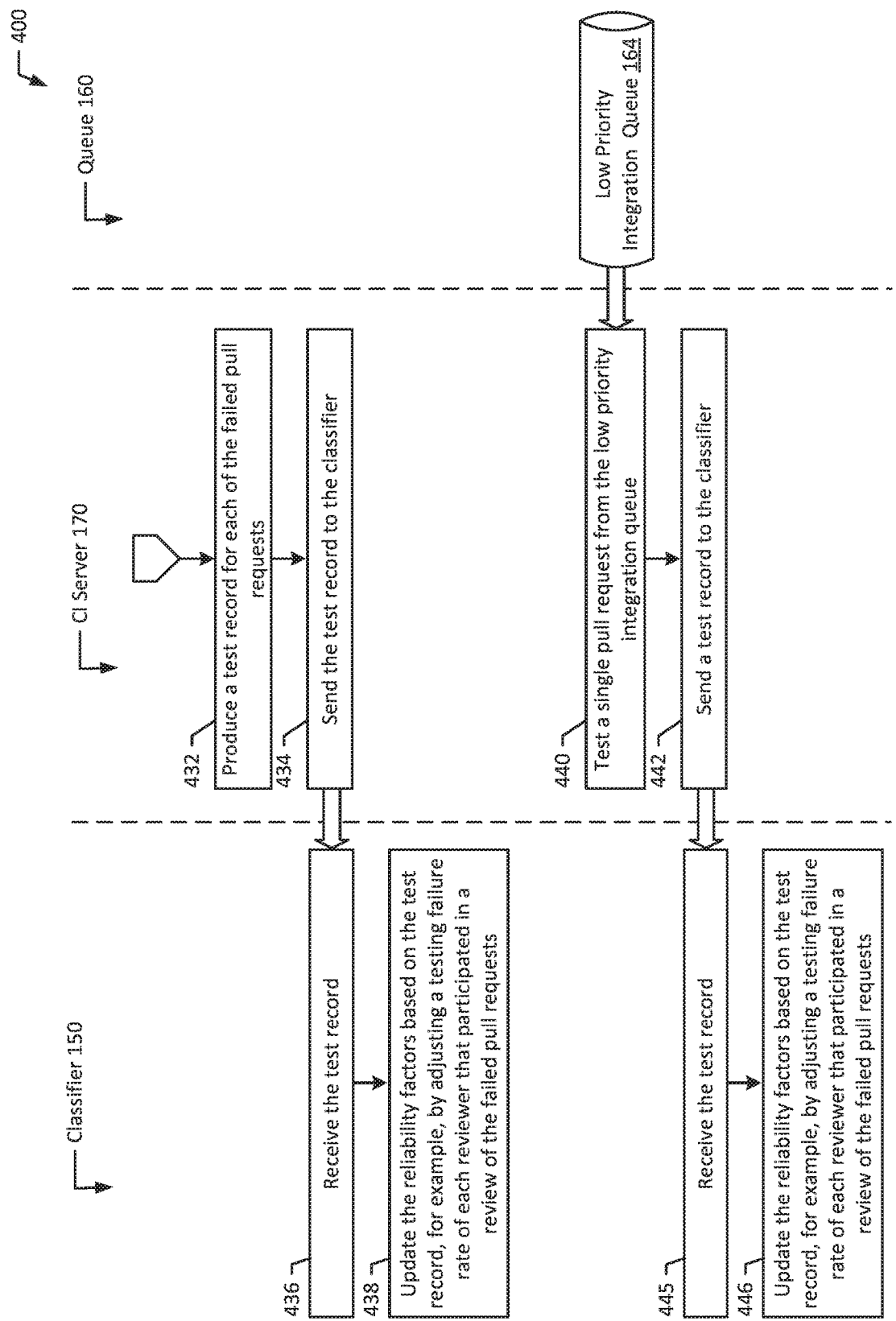

FIGS. 4A, 4B, and 4C illustrate a flow diagram of an example method 400 for optimizing CI using code review quality according to an example of the present disclosure. Although the example method 400 is described with reference to the flow diagram illustrated in FIGS. 4A, 4B, and 4C, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including a classifier 150, a CI server 170, and an integration queue 160 (e.g., a high priority integration queue 162 and a low priority integration queue 164) communicating or interacting with each other.

In the illustrated example, a classifier 150 may receive pull requests 180A-C for code changes (block 402). The pull requests may be submitted by contributors 182A-C. Then, the classifier 150 may determine reliability factors of the pull requests 180A-C (block 404). The reliability factors may include a quality of the contributors, a quality of reviews, and a size of the code changes. The classifier 150 may determine a reliability value for each of the pull requests 180A-C (e.g., from 0 (completely untrusted) to 3 (completely trusted)) based on the reliability factors (block 406). For example, the classifier 150 may determine that the reliability values of the pull requests 180A, 180B, and 180C are 2.8, 2.1, and 1.2, respectively.

Then, the classifier 150 may classify each of the pull requests 180A-C into a classification, such as a trusted classification or an untrusted classification (e.g., 0≤reliability value<1.5: untrusted, 1.5≤reliability value≤3: trusted) (block 408). For example, the classifier 150 may classify the pull requests 180A (reliability value: 2.8) and 180B (reliability value: 2.1) as trusted and 180C (reliability value: 1.2) as untrusted. Then, the classifier 150 may send the pull requests in the trusted classification (e.g., 180A-B) to a high priority integration queue 162 (block 410). The classifier 150 may send the pull requests in the untrusted classification (e.g., 180C) to a low priority integration queue 164 (block 421).

A CI server 170 may pull the pull requests in the integration queue 160. Then, the CI server 170 may test each of pull requests 180A-C, prioritizing the pull requests in the high priority integration queue 162 over the pull requests in the low priority integration queue 164 (block 414). In an example, the CI server 170 prioritizes the pull requests in the high priority queue (e.g., 180A-B) over the pull requests in the low priority integration queue 164 (e.g., 180C) during the testing by allocating more resources (e.g., CPU power, CPU cycles, or memory) to the pull requests in the high priority queue 162. In an example, the CI server 170 prioritizes the pull requests in the high priority queue over the pull requests in the low priority integration queue 164 during the testing by testing each of the pull requests in the high priority integration queue 162 before testing any of the pull requests in the low priority integration queue 164.

In an example, the CI server 170 may test a batch of at least two pull requests in the high priority integration queue 162 together in one test cycle (block 416). For example, the CI server 170 may test a batch of pull requests 180A and 180B in the high priority integration queue 162 together in one test cycle. As discussed above, the number of tests necessary for each pull request may be different. For example, pull request 180A may require 1500 tests and pull request 180B may require 1200 tests. In an example, there may be some overlaps (e.g., 300 tests) between the tests necessary for pull request 180A and the tests for pull request 180B. By testing these two pull requests 180A and 180B in the high priority integration queue 162 together in one test cycle, the system 400 may be able to remove duplicative tests (e.g., 300 tests) to have 2400 tests total, rather than 2700 tests, reducing the number of the tests by around 11% while still keeping a high likelihood that the tests will all pass since the batched tests are trusted.

In an example, the CI server 170 may determine whether the pull requests in the high priority integration queue 162 (e.g., pull requests 180A-B) have passed the testing (block 418). If the pull requests passed the testing, the CI server 170 may merge the code changes in the passed pull requests, prioritizing the pull requests in the high priority integration queue 162 (block 420). For example, the CI server 170 may merge the code changes with the master source code in the public repository 105. In an example, the CI server 170 prioritizes the pull requests in the high priority queue during the merging by merging each of the passed pull requests that were in the high priority integration queue 162 before merging any of the passed pull requests that were in the low priority integration queue 164. In an example, the CI server 170 may merge the code changes in the passed pull requests in the order the pull requests are tested (e.g., in the order the testing was started or ended). In another example, the CI server may merge the code changes in any other suitable order.

In an example, the CI server 170 may produce a test record for each of the passed pull requests (block 422). The test record may include the results of the tests (e.g., passed or failed, reviewers who participated in a review of the pull request, contributors of the pull request, a size of code changes, a number of passed tests, and/or a list of passed tests). The CI server 170 may send the test record to the classifier 150 (blocks 424 & 426). Then, the classifier 150 may update the reliability factors based on the test record (block 428). For example, the classifier 150 may adjust (e.g., decrease) the testing failure rate of the contributors and reviewers who participated in the passed pull request and/or raise the reliability value of the contributors and reviewers who participated in the passed pull requests.

In an example, the CI server 170 may reject code changes in each pull request that has failed the testing (block 430). In this case, the CI server 170 may not merge the code changes in the failed pull requests with the master codes in the public repository 105. The CI server 170 may produce a test record for each of the failed pull requests (block 432). As discussed above, the test record may include the results of the tests (e.g., passed or failed, reviewers who participated in a review of the pull request, contributors of the pull request, a size of code changes, a number of failed testes, a list of failed testes, and/or the number of integration errors). The CI server 170 may send the test record to the classifier 150 (blocks 434 & 436). Then, the classifier 150 may update the reliability factors based on the test record, for example, by adjusting (e.g., raising) a testing failure rate of each contributor and/or each reviewer who participated in a review of the failed pull requests (block 438). In an example, the classifier 150 may adjust (e.g., decrease) the reliability value of the contributors and reviewers who participated in the passed pull requests.

In an example, the CI server 170 may test a single pull request from the low priority integration queue 164 (block 440). The CI server 170 and the classifier 150 may repeat the steps described at blocks 418, 420, 422, 430, and 432. Then, the CI server 170 may send a test record for the passed/failed pull requests to the classifier (block 442). The classifier 150 may receive the test record (block 445). The classifier 150 may update the reliability factors based on the test record (block 446). For example, the classifier 150 adjusts (e.g., raising or decreasing) the testing failure rate of each contributor or each reviewer who participated in a review of the failed pull requests. In an example, the classifier 150 may update the reliability factors based on the test records (e.g., from tests of all pull requests) using machine learning techniques.

Figure 5:
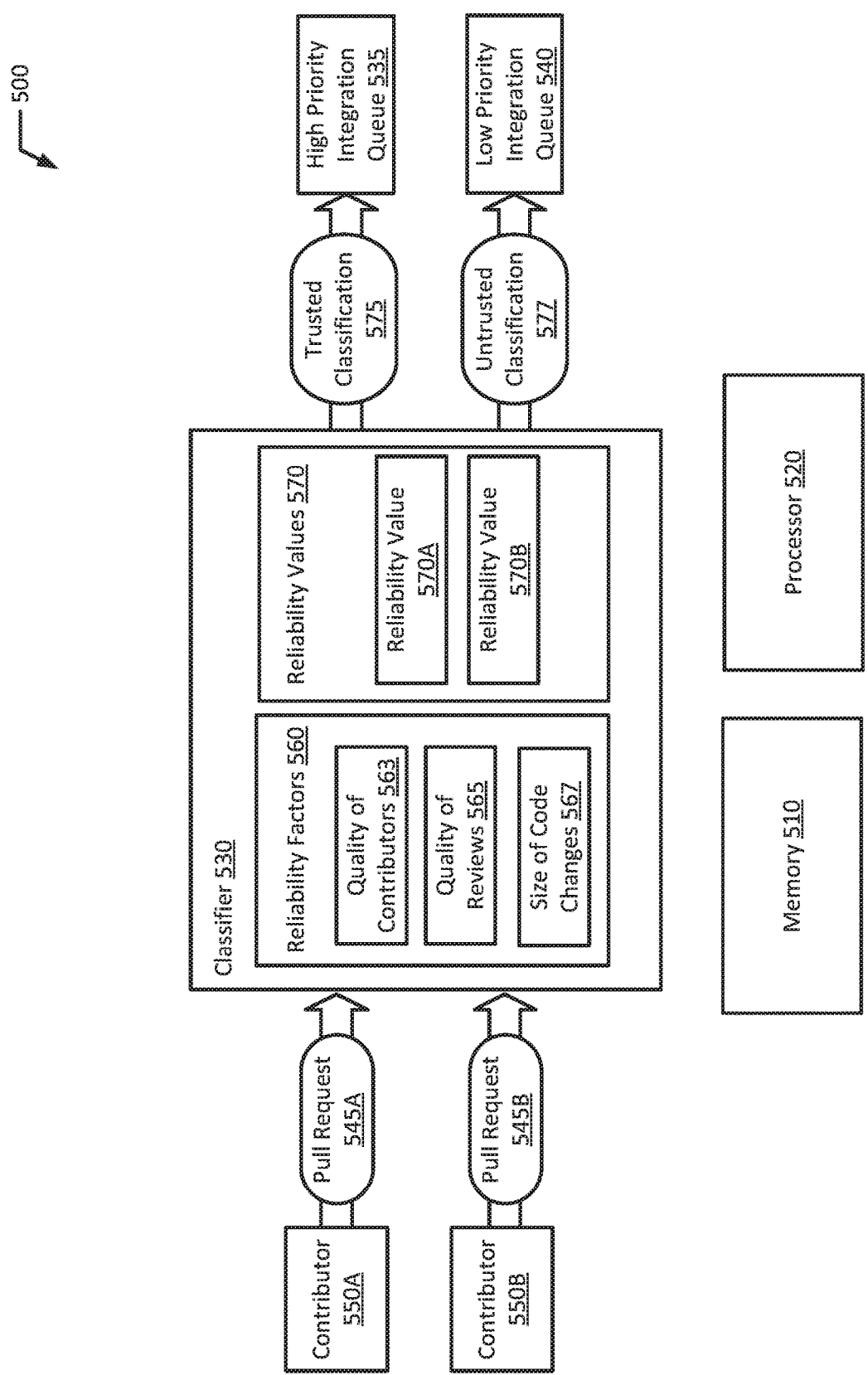
FIG. 5 is a block diagram of an example computer system according to an example of the present disclosure.

FIG. 5 shows a block diagram of an example system according to an example of the present disclosure. As illustrated in FIG. 5, an example system 500 includes a memory 510, a processor 520 in communication with the memory, a classifier 530 executing on the processor 520, a high priority integration queue 535, and a low priority integration queue 540. In an example, the classifier 530 receives pull requests 545A-B for code changes, where the pull requests 545A-B are submitted by contributors 550A-B. The classifier 530 determines reliability factors 560 including the quality of the contributors 563, the quality of reviews 565, and the size of the code changes 567. The classifier 530 determines reliability values 570A-B of each of the pull requests 545A-B based on the reliability factors 560. The classifier 530 classifies each of the pull requests 545A-B into a classification, such as a trusted classification 575 and an untrusted classification 577. Then, the classifier 530 sends pull requests in the trusted classification 575 to the high priority integration queue 535 and the pull requests in the untrusted classification 577 to the low priority integration queue 540. Accordingly, the presently disclosed system may optimize continuous integration using code review quality by prioritizing more highly trusted pull requests that are likely to be good quality over less trusted pull requests that are likely to be poor quality during the testing and/or merging, which may advantageously reduce the number of unnecessary CI tests and, thereby, saving development time and costs and increasing the efficiency of the CI processing system.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   receiving, by a classifier executing on a processor in communication with a memory, a plurality of pull requests for code changes, wherein the plurality of pull requests are submitted by a plurality of contributors;
   determining, by the classifier, a plurality of reliability factors, wherein the plurality of reliability factors include a quality of the plurality of contributors, a quality of reviews, and a size of the code changes;
   determining, by the classifier, a reliability value of each pull request of the plurality of pull requests based on the plurality of reliability factors;
   classifying, by the classifier, each pull request of the plurality of pull requests into one classification of a plurality of classifications, wherein the plurality of classifications include a trusted classification and an untrusted classification;
   sending, by the classifier, a first plurality of pull requests in the trusted classification to a high priority integration queue;
   sending, by the classifier, a second plurality of pull requests in the untrusted classification to a low priority integration queue; and
   testing, by a continuous integration (CI) server, each pull request of the plurality of pull requests, wherein the CI server prioritizes the first plurality of pull requests in the high priority integration queue over the second plurality of pull requests in the low priority integration queue during the testing of each pull request of the plurality of pull requests.

2. The method of claim 1, wherein the CI server prioritizes the first plurality of pull requests in the high priority integration queue during the testing of each pull request of the plurality of pull requests by testing each pull request of the first plurality of pull requests in the high priority integration queue before testing any pull request of the second plurality of pull requests in the low priority integration queue.

3. The method of claim 1, further comprising merging, by the CI server, the code changes in each pull request of the plurality of pull requests that passed the testing of each pull request of the plurality of pull requests, wherein the CI server prioritizes the first plurality of pull requests in the high priority integration queue over the second plurality of pull requests in the low priority integration queue during the merging of the code changes in each pull request of the plurality of pull requests that passed the testing of each pull request of the plurality of pull requests.

4. The method of claim 1, further comprising:
   producing, by the CI server, a test record for the plurality of pull requests from the testing of each pull request of the plurality of pull requests, wherein the test record includes a plurality of results of a plurality of tests;
   sending, by the CI server, the test record to the classifier; and
   updating, by the classifier, the plurality of reliability factors based on the test record.

5. The method of claim 4, wherein the quality of reviews includes at least one of a quantity of reviewers that participated in a review of each pull request of the plurality of pull requests, a quantity of reviews that each reviewer has conducted previously, and a testing failure rate of each reviewer.

6. The method of claim 5, wherein the CI server rejects code changes in each pull request of the plurality of pull requests that has failed the testing of each pull request of the plurality of pull requests.

7. The method of claim 6, wherein responsive to the failed pull request of the plurality of pull requests, the classifier adjusts the testing failure rate of each reviewer that participated in a review of the failed pull request of the plurality of pull requests.

8. The method of claim 1, wherein the CI server tests a batch of at least two pull requests of the plurality of pull requests in the high priority integration queue together in one test cycle to reduce the number of duplicate tests.

9. The method of claim 1, wherein the classifier determines the plurality of reliability factors using machine learning techniques.

10. A system comprising:
    a memory;
    a processor in communication with the memory;
    a classifier executing on the processor;
    a continuous integration (CI) server;
    a high priority integration queue; and
    a low priority integration queue,
    wherein the classifier:
      receives a plurality of pull requests for code changes, wherein the plurality of pull requests are submitted by a plurality of contributors;
      determines a plurality of reliability factors, wherein the plurality of reliability factors include a quality of the plurality of contributors, a quality of reviews, and a size of the code changes;
      determines a reliability value of each pull request of the plurality of pull requests based on the plurality of reliability factors;
      classifies each pull request of the plurality of pull requests into one classification of a plurality of classifications, wherein the plurality of classifications include a trusted classification and an untrusted classification;
      sends a first plurality of pull requests in the trusted classification to the high priority integration queue; and
      sends a second plurality of pull requests in the untrusted classification to the low priority integration queue, and
    wherein the CI server:
      tests each pull request of the plurality of pull requests; and
      prioritizes the first plurality of pull requests in the high priority integration queue over the second plurality of pull requests in the low priority integration queue during the testing of each pull request of the plurality of pull requests.

11. The system of claim 10, wherein the CI server prioritizes the first plurality of pull requests in the high priority integration queue during the testing of each pull request of the plurality of pull requests by testing each pull request of the first plurality of pull requests in the high priority integration queue before testing any pull request of the second plurality of pull requests in the low priority integration queue.

12. The system of claim 10, wherein the CI server merges the code changes in each pull request of the plurality of pull requests that passed the testing of each pull request of the plurality of pull requests and prioritizes the first plurality of pull requests in the high priority integration queue over the second plurality of pull requests in the low priority integration queue during the merging of the code changes in each pull request of the plurality of pull requests that passed the testing of each pull request of the plurality of pull requests.

13. The system of claim 10, wherein the CI server:
produces a test record for the plurality of pull requests from the testing of each pull request of the plurality of pull requests, wherein the test record includes a plurality of results of a plurality of tests; and
sends the test record to the classifier, which allows the classifier to update the plurality of reliability factors based on the test record.

14. The system of claim 13, wherein the quality of reviews includes at least one of a quantity of reviewers that participated in a review of each pull request of the plurality of pull requests, a quantity of reviews that each reviewer has conducted previously, and a testing failure rate of each reviewer.

15. The system of claim 14, wherein the CI server rejects code changes in each pull request of the plurality of pull requests that has failed the testing of each pull request of the plurality of pull requests.

16. The system of claim 15, wherein responsive to the failed pull request of the plurality of pull requests, the classifier adjusts the testing failure rate of each reviewer that participated in a review of the failed pull request of the plurality of pull requests.

17. The system of claim 10, wherein the CI server tests a batch of at least two pull requests of the plurality of pull requests in the high priority integration queue together in one test cycle to reduce the number of duplicate tests.

18. A non-transitory machine readable medium storing instructions, which when executed by a physical processor, cause the physical processor to:
receive, by a classifier executing on the physical processor, a plurality of pull requests for code changes, wherein the plurality of pull requests are submitted by a plurality of contributors;
determine, by the classifier, a plurality of reliability factors, wherein the plurality of reliability factors include a quality of the plurality of contributors, a quality of reviews, and a size of the code changes;
determine, by the classifier, a reliability value of each pull request of the plurality of pull requests based on the plurality of reliability factors;
classify, by the classifier, each pull request of the plurality of pull requests into one classification of a plurality of classifications, wherein the plurality of classifications include a trusted classification and an untrusted classification;
send, by the classifier, a first plurality of pull requests in the trusted classification to a high priority integration queue;
send, by the classifier, a second plurality of pull requests in the untrusted classification to a low priority integration queue; and
test, by a continuous integration (CI) server, each pull request of the plurality of pull requests, wherein the CI server prioritizes the first plurality of pull requests in the high priority integration queue over the second plurality of pull requests in the low priority integration queue during the testing of each pull request of the plurality of pull requests.

* * * * *